April 16, 1963 J. ARNAUD ETAL 3,086,180

DELAY LINE FOR TRAVELLING WAVE TUBES

Filed Feb. 17, 1959 2 Sheets-Sheet 1

INVENTORS
J. ARNAUD
& B. EPSZTEIN
BY Craig & Freudenberg
ATTORNEY

DELAY LINE FOR TRAVELLING WAVE TUBES

Filed Feb. 17, 1959 2 Sheets-Sheet 2

INVENTORS
J. ARNAUD
& B. EPSZTEIN
BY Craig & Freudenberg
ATTORNEY

United States Patent Office 3,086,180
Patented Apr. 16, 1963

3,086,180
DELAY LINE FOR TRAVELLING WAVE TUBES

Jacques Arnaud, Paris, France, and Bernard Epsztein, Jamaica, N.Y., assignors to Compagnie Generale de Telegraphie sans Fil, Paris, France Filed Feb. 17, 1959, Ser. No. 793,835
Claims priority, application France Feb. 27, 1958
21 Claims. (Cl. 333—31)

The present invention relates to a delay line for electron discharge devices and, more particularly, to a rugged delay line structure for use in high-power travelling wave tubes.

At present in high-power travelling wave amplifier tubes, a delay line circuit is used which is constituted by a ladder-type line, disposed essentially parallel to a metallic surface usually designated as "back plate" which enables the attainment of a relatively smaller dispersion.

Such prior art structure as used in travelling wave tubes is represented, for example, in FIGURE 3 of the French Patent 1,068,673 of June 28, 1952 taken out in the name of the assignee of the present application.

In practice, in order to avoid thermal deformations of the individual elements or bars of the ladder-type structure, it is necessary to split or separate the same in the center thereof to provide a gap or slot thereat in such a manner as to permit the free expansion thereof as provided, for example, in the French Patent 1,086,890 of July 18, 1953, also taken out in the name of the assignee of the present application.

The prior art structure described hereinabove which utilizes the arrangements mentioned hereinabove entails the defect which consists in the possible propagation, in addition of the desired symmetric mode, of an anti-symmetric or asymmetric mode for the propagation of which the dimension of the gap, slot or separation in the bars or delay line elements plays an essential role. Theoretical calculations and actual measurements in tests indicate that the dispersion curve of this latter mode differs only little in the usual cases from the principal propagation, the curve being simply displaced slightly toward the lower frequencies. With a given phase velocity thus corresponding to both the propagation of the symmetric mode and anti-symmetric mode on wave lengths which are not very different from one another, the amplifier may amplify simultaneously both modes which results in troubled functioning and in an undesirable operation of the tube.

The object of the present invention is a circuit for travelling wave tubes of relatively high power which is electrically equivalent of the prior art structure defined hereinabove, which, as this prior art line, also enjoys the properties of mechanical sturdiness, and which also permits the free expansion of the bars or elements of the delay line, but in which the wave length of the symmetric mode and that of the anti-symmetric mode, with a given phase velocity, are separated from each other by an interval which is much greater than in the preceding case of the prior art structure by such an extent that amplification of the anti-symmetric mode will not take place since the interaction thereof with the beam, if it takes place on the wave length of the symmetric mode, will not occur on that of the anti-symmetric mode.

Accordingly, it is an object of the present invention to provide a delay line structure for high-power travelling wave tubes which obviates the disadvantages of the prior art.

Another object of the present invention is the provision of a delay line circuit for high-power travelling wave tubes which is mechanically sturdy and adapted to readily dissipate large quantities of heat.

Still another object of the present invention is the provision of a delay line structure for high-power travelling wave tube amplifiers in which the danger of deformation of the individual delay line elements is minimized by permitting the same to freely expand under the influence of heat generated by the power dissipated in the tube.

A still further object of the present invention is to provide a delay line circuit for travelling wave tube amplifiers adapted to operate at relatively elevated power ratings which prevents the amplification of undesired modes at the wave lengths for which the tube is intended to operate as amplifier with a predetermined mode.

These and other objects, features and advantages of the present invention will become more apparent from the following description when taken in connection with the accompanying drawing, which shows, for purposes of illustration only, several embodiments in accordance with the present invention and wherein.

The present invention essentially consists in a delay line circuit which is mechanically sturdy and free to expand for use with travelling wave tubes, and is constituted of a series of identical conducting elements that are T-shaped, disposed in essentially parallel planes equidistant from one another and aligned perpendicularly to these planes, the delay line in accordance with the present invention being operatively disposed with respect to a conductive back plate disposed in proximity to the arm portions of the T-shaped elements, parallel to these arm portions and on the side of the leg portions of the T's of which the leg portions are electrically interconnected with each other.

More particularly, the structure in accordance with the present invention comprises a rectangular wave guide provided with a longitudinal slot or gap in the plane of symmetry of one of the walls thereof, and a series of T-shaped delay line elements of which the leg portions pass through the gap or slot essentially perpendicularly to the slotted wall portion and secured to the bottom of the guide at a constant distance between the respective points where they are secured thereto whereas the arm portions of the T's extend perpendicularly to the gap or slot and in parallel to the external face of the wall portion which forms the back plate, these arm portions thereby forming bars, of which the ends thereof are free.

Figure 1:
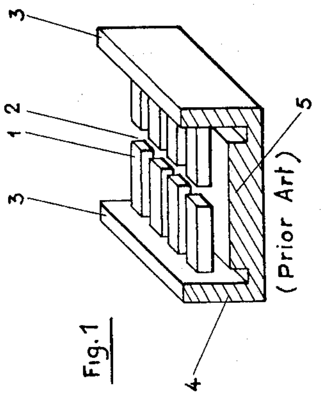
FIGURE 1 is a partial perspective view of a delay line circuit of the prior art.

Referring now to the drawing wherein like reference numerals are used throughout the various views to designate like parts, and more particularly to FIGURE 1 thereof, the delay line circuit illustrated therein utilizes an arrangement represented by a combination of the teachings of the aforementioned French Patents 1,068,673 and 1,086,890. The bars or individual elements 1 of the ladder, cut in the center thereof by means of slots 2, are supported by lateral cheek portions 3 forming the supports of the ladder and secured to a common base 4. On this same common base 4 is disposed a so-called "back plate" 5 of which the surface is parallel to the bars 1 and relatively close thereto.

The structure illustrated in FIGURE 1 is mechanically robust and sturdy, assures a sufficiently weak dispersion of the fundamental forward wave and permits a free expansion of the bars or delay elements 1. However, the delay line circuit of FIGURE 1 exhibits a serious disadvantage which will be better understood by reference to FIGURES 2 and 3 which represent schematically bar-type ladder structures which are integral or uncut and cut, respectively.

Figure 3:
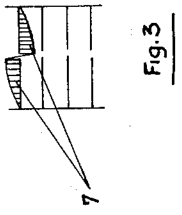
FIGURES 2 and 3 are diagrammatic showings of the field distribution on the bars or delay elements of the ladder-type delay lines.
Figure 2:
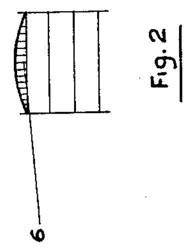

Whereas in the case of a bar-type ladder structure which is uncut or integral as illustrated in FIGURE 2, the propagation in the useful band of frequencies takes place at a single symmetric mode producing on the bars thereof a field distribution having the general shape or outline of a half-sinusoid with the nodes thereof at the place of support, as illustrated by curve 6, the bar-type ladder structure which is cut, as shown in FIGURE 3, permits, in addition to this symmetric mode of propagation, the propagation of the anti-symmetric mode of which the field distribution, as illustrated by curve 7 in FIGURE 3, is composed essenitally of two quarts of a sinusoid also with the nodes thereof at the supports but with an abrupt phase variation at the capacity formed in the middle of each bar by the free ends of the two half-bars whereby the anti-nodes of the voltage at the ends of the two half-bars have opposite polarities.

It should be noted that whereas for the symmetric mode the half wave length corresponds to the dimension of the line, for the antisymmetric mode of the cut bar, the half wave length is also very close to the dimension of the line, the deviation from an exact coincidence therebetween being only due to the proximitiy of facing bars. Consequently, the symmetric mode and anti-symmetric mode propagate on very closely adjacent wave lengths, so much so that the latter may impair the amplification of the former in an undesirable manner. Furthermore, this anti-symmetric mode is likely to be completely reflected at the input and output of the tube so that auto-oscillations may well be set up therein.

Figure 4:
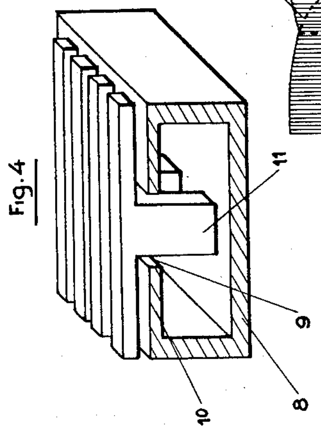
FIGURE 4 is a partial perspective view of a delay line circuit in accordance with the present invention.

The circuit illustrated in perspective in FIGURE 4 eliminates these inconveniences and disadvantages, while at the same time, retaining all of the advantages obtainable with the structure of FIGURE 1. The delay line circuit of FIGURE 4 comprises a rectangular guide 8 provided with a longitudinal gap or slot 9 in the plane of symmetry of the wall 10 thereof and with a series of T-shaped delay elements 11 of which the leg portions pass through the slot 9 essentially perpendicularly to the wall 10 and are secured or fixed to the bottom of the guide 8, the distance between adjacent points where the leg portions are secured to the bottom 8 of the guide being constant or essentially equidistant from one another which imparts a characteristic of geometric periodicity to the structure. The arm portions of the T-shaped elements 11 extend essentially perpendicularly to the gap 9 and essentially in parallel to the external face of the wall portion 10 which forms the "back-plate." These arm portions thus form the bars of which the ends are free.

The structure of FIG. 4 may be considered as a filter as well as the known structure of FIG. 1. The two structures consequently may be employed for the same applications.

It is seen that such an electrically equivalent structure also displays the same mechanical qualities, i.e. the circuit of FIG. 4 has the same sturdiness and the same freedom of expansion of the bars as the circuit of FIG. 1.

Figure 5:
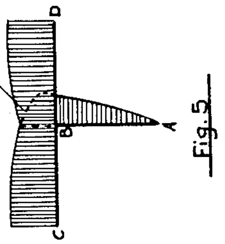
FIGURES 5 and 6 are diagrammatic showings of the field distribution on the T-shaped delay elements of the delay circuit of FIGURE 4.
Figure 6:
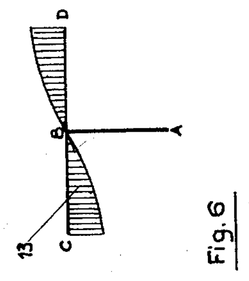

However, as shown in FIGURES 5 and 6, the equivalency no longer exists between FIGURES 1 and 4 with respect to the approximate equality of the wave lengths for the symmetric and anti-symmetric modes. Indeed, the circuit of FIG. 4 is utilisable in the symmetric mode over a band centered on the wave length which is equal to four times the sum of the lengths of the leg portion and one arm portion of a T (AB and BC or BD in FIGS. 5 and 6). This means, for $AB=BC$, that the width CD of the line is a quarter of the wave length of propagation of the symmetric mode. The curve 12 of FIG. 5 then indicates the field distribution corresponding to this mode and shows that the field, which has a node at the bottom of the leg portion of the T, increases in a sinusoidal way along the leg portion till the middle B of the bar, and then from point B the amplitude attained thereat increases symmetrically toward the bar extremities C and D where the anti-nodes of the field take place.

FIG. 6 shows in 13 the field distributions of the anti-symmetric mode. It is seen that the anti-nodes or loops take place at C and D, but a node is produced in the middle point B. Since the field is also nil in A, there is no field along the leg portion AB. Thus, the width CD of the line is equal to half the wave length of propagation of the anti-symmetric mode.

It is seen that there is a considerable difference between the wave lengths of the two modes since the same width CD of the line corresponds to a quarter of a length in one case and to half a wave length in the other case.

Figure 7:
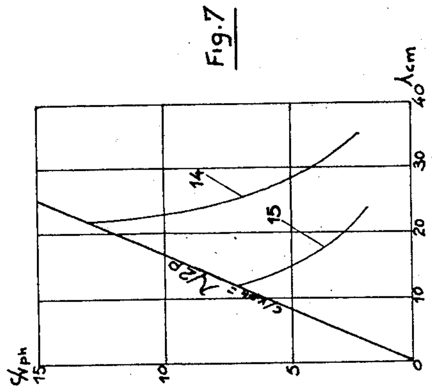
FIGURE 7 is a diagram showing the dispersion curve of a delay line circuit in accordance with the present invention constructed according to FIGURE 4.

This result has been confirmed experimentally by plotting the dispersion curves for a certain circuit constructed according to FIGURE 4, intended for use in a tube provided for a band between 23 and 40 cm. These curves are shown in FIGURE 7 in the form of diagrams plotting the delay ratio $c/v_{ph}$, where $c$=speed of light, and $v_{ph}$=phase velocity of the wave, as a function of the wave length $\lambda$. Within the angle comprised between the axis of abscissa and the straight of $c/v_{ph}=\lambda/2p$, where $p$ is the pitch of the structure, this straight line representing the location of the $\pi$ modes, there is found a curve 14 representing the dispersion of the fundamental space wave of the symmetric mode and a curve 15 representing the dispersion of the fundamental space wave of the anti-symmetric mode. It may be readily seen that for a given value of $c/v_{ph}$, the wave lengths of the two modes are about at the ratio of 1:2 which locates the anti-symmetric mode outside the zone of interaction corresponding to the amplification of the symmetric mode.

Figure 8:
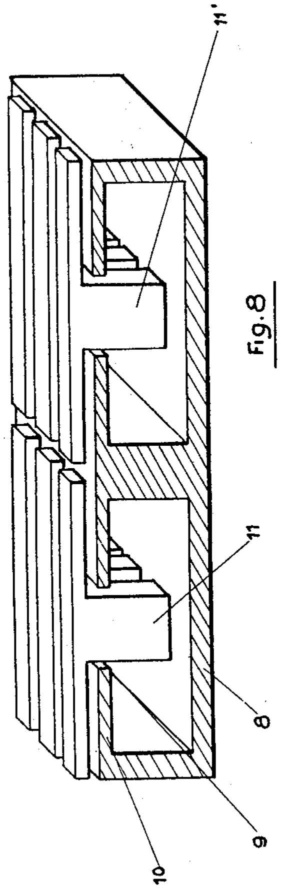
FIGURE 8 is a partial perspective view of a modified embodiment of a delay line circuit in accordance with the present invention showing a further development of the delay line illustrated in FIGURE 4.

FIGURE 8 in which the same reference numerals are used to designate the same elements as in FIGURE 4, represents a further development in accordance with the present invention which essentially consists of placing, side by side, several of the delay circuits of FIGURE 4, for example, two circuits thereof including, respectively, the series of T-shaped delay line elements designated by reference numerals 11 and 11'. The circuit resulting from such an arrangement is thereby periodic not only in the direction perpendicular to the bars, but also in the direction of the alignment of the homologous bars of juxtaposed delay circuits. Such a circuit is particularly suitable for use with tubes of very high power and also with all those tubes in which periodic bi-dimensional structures can be used.

Figure 9:
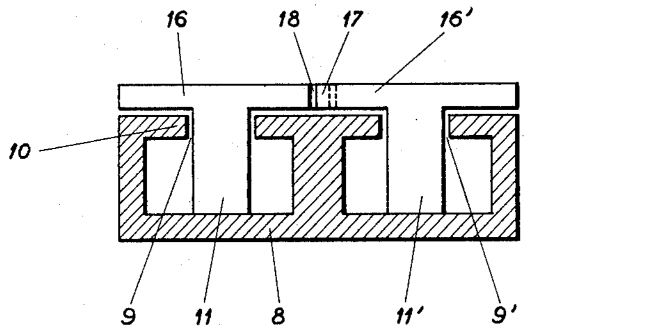
FIGURE 9 is a transverse cross-sectional view of still another modified embodiment of a delay line circuit in accordance with the present invention.
Figure 10:
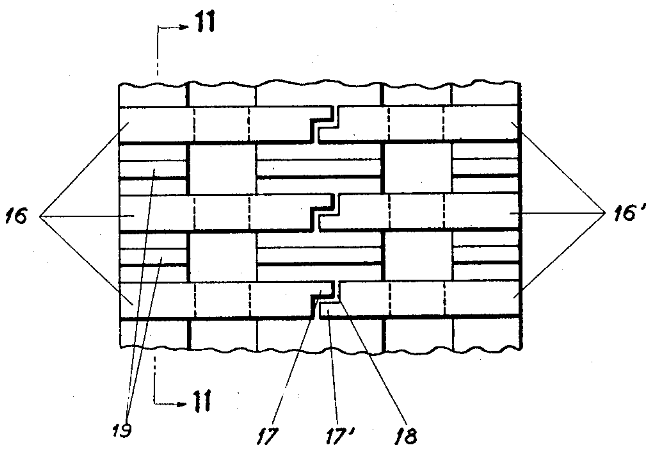
FIGURE 10 is a plan view of the delay line circuit of FIGURE 9 in accordance with the present invention.
Figure 11:
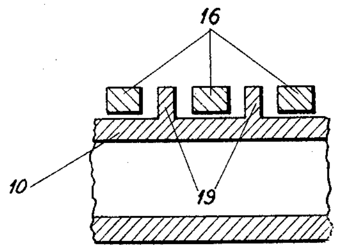
FIGURE 11 is a transverse cross-sectional view taken along line 11—11 of FIGURE 10.

FIGURES 9, 10 and 11 represent a still further development of a delay line structure of FIGURE 8 according to the present invention which includes certain improvements over the same.

A first improvement of the delay line structure of FIGURES 9 through 11 resides in the fact that it enables an increased accentuation of the separation between the symmetric mode and the anti-symmetric mode of propagation. This first improvement according to FIGURES 9 through 11 essentially consists in effectively increasing the capacitive coupling between the free ends of the arm portions of the T-shaped elements which face one another by the fact of the juxtaposition alongside one another, for example, by terminating the ends thereof in a step-like manner and by interdigitating the stepped ends.

A second improvement which may be obtained with a structure in accordance with FIGURES 9 through 11 permits an enlargement of the useful band of the line and consists in providing ridges along the external surface of the guide.

As in FIGURE 8, the delay circuit according to FIGURES 9 through 11 comprises a wave guide 8 composed, for example, of two rectangular wave guides placed alongside each other, provided with two longitudinal slots 9 and 9' in the upper wall 10 thereof. The delay elements 11 and 11' have the shape of T's, of which the leg portions pass respectively through the slots 9 and 9' and are secured at the bottom thereof to the bottom of the guide 8 whereas the arm portions 16 and 16' of the T's extend essentially in parallel to the wall 10 and perpendicularly to the slots or gaps 9 and 9'. One end of each of the arm portions 16 faces the end of an adjacent homologous arms portion 16'. Each respective series of delay elements 11 and 11' includes elements periodically spaced in the longitudinal direction of the delay line.

According to the first improvement of this line mentioned hereinabove, the capacitive coupling between ends facing one another of each pair of arm portions 16 and 16' is increased, by terminating the ends thereof in the form of stepped portions 17 and 17' and by interdigitating these step portions 17 and 17' in such a manner that they are separated by a spacing, slot or gap 18 in the form of zigzag or Z.

Actual measurements have indicated that the separation between the symmetric mode and the anti-symmetric mode is further enhanced by a structure according to FIGURES 9–11 as compared to the structures of the embodiment of FIGURE 8.

The ridges 19 may additionally be provided on the surface 10 of the delay line structure in such a manner as to engage between successive T's as shown in FIGURE 11 which produces the second improvement mentioned hereinabove, namely the increase in band width.

While we have shown and described several embodiments in accordance with the present invention, it is understood that the same is not limited thereto but is susceptible of many changes and modifications within the spirit and scope of the present invention, as known to a person skilled in the art. In particular, the rectilinear guides illustrated in FIGURES 4, 8, or 9 through 11 may be effectively wound or bent into cylindrical form, about an axis either parallel or perpendicular to the bars. Additionally, or in the alternative, the number of juxtaposed circuits shown in FIGURES 8 or 9 through 11 is susceptible of change, any suitable number being usable, and the cross section of the T-shaped elements either across the leg portions thereof or across the bars thereof may receive any other desired shape as dictated by the needs of the practical use, constructions and applications.

Thus, it is quite obvious that the present invention is not limited to the particular delay line circuits illustrated herein, but may be varied at will within the spirit and scope of the present invention and we, therefore, do not wish to be limited to the particular embodiments described and illustrated herein, but intend to cover all such changes and modifications as are encompassed by the scope of the appended claims.

We claim:

1. A delay circuit for microwaves, comprising at least one series of substantially identical T-shaped conductive delay members each including symmetric arm portions and a leg portion having a length essentially of the order of the length of an arm portion, said members being respectively located in essentially parallel planes and aligned in a direction at an angle to said planes, a conductive back plate extending parallel to the arm portions of said T-shaped members and in proximity thereto on the side of the leg portions of said T-shaped members, said back plate being provided with aperture means for receiving therein the leg portions, and means additional to and spaced from said back plate and electrically connected thereto for electrically interconnecting the extremities of said leg portions remote from said arm portions.

2. A delay circuit as claimed in claim 1, wherein the planes of said T-shaped members are equidistant, thereby forming a geometrically periodical structure in the direction of alignment thereof.

3. A delay circuit for microwaves, comprising a plurality of series of substantially identical T-shaped conductive delay members each having symmetrically arranged arm portions and a leg portion disposed essentially in the center of said arm portions, said members being respectively located in essentially parallel planes and aligned in a direction at an angle to said planes, said respective series being located side by side one directly following another so that the arm portions of respective T-shaped members are essentially aligned in the directions of said arm portions, conductive back plate means extending essentially in parallel to said arm portions and in proximity thereto along the side of the leg portions thereof, and means including an electrically conductive member in addition to said conductive back plate means and electrically connected thereto for electrically interconnecting the extremities of said leg portions remote from said arm portions.

4. A delay circuit as claimed in claim 3, comprising means for increasing the capacitive coupling between neighboring extremities of said arm portions belonging respectively to adjacent series of delay members.

5. A delay circuit as claimed in claim 4, wherein said extremities are stepwise shaped, and adjacent step-shaped extremities are interdigitated.

6. A delay circuit as claimed in claim 5, further comprising means in said delay circuit for increasing the effective band thereof.

7. A delay circuit as claimed in claim 6, wherein said last-mentioned means are formed by ridges extending between said arm portions.

8. A delay circuit as claimed in claim 3, further comprising means in said delay circuit for increasing the effective band thereof.

9. A delay circuit as claimed in claim 8, wherein said last-mentioned means are formed by ridges extending between said arm portions.

10. A delay circuit adapted to propagate a predetermined desired mode for use in relatively high-power travelling wave amplifier tubes or the like comprising a plurality of essentially similar delay elements arranged to provide a periodic structure, each delay element comprising at least two portions disposed at an angle to each other and extending in different directions, the two portions of each delay element being rigidly connected with each other, and means operatively connected with said delay circuit for preventing the propagation in said delay circuit of an anti-symmetric mode near the operating frequencies of said desired symmetric mode including conductive means formed by a hollow wave guide provided with aperture means for receiving therein a first portion of each delay element and operable to thereby electrically interconnect a first portion of each delay element while each second portion thereof has at least one free end extending at a distance from said conductive means on the outside of and spaced from the walls of said wave guide thereby providing a predetermined electric field distribution between said second portions and the walls of said wave guide.

11. A delay circuit adapted to propagate therethrough a predetermined desired mode for use in relatively high-power travelling wave amplifier tubes or the like, comprising a plurality of essentially similar delay elements arranged to provide a periodic structure, each delay element comprising at least two connected portions disposed at an angle to each other and extending in mutually different directions, and means operatively connected with said delay circuit for preventing the propagation in said delay circuit of an anti-symmetric mode near the operating frequencies of said desired symmetric mode including first conductive means electrically interconnecting a first portion of each delay element and second conductive means electrically connected to said first conductive means and extending at a relatively small distance from and at least over a major area of the second portion of each delay element to thereby provide a predetermined electric field distribution along both portions of each delay element.

12. A bi-dimensional structure delay circuit according to claim 11, composed of at least two of said delay circuits placed alongside one another.

13. A bi-dimensional delay circuit structure according to claim 12, further comprising means in said structure increasing the effective capacitive coupling between mutually facing second portions of respective delay circuits.

14. A bi-dimensional delay circuit structure according to claim 13, further comprising means in said structure increasing the effective band thereof.

15. A delay line structure comprising a rectangular metallic wave guide having two broad and two narrow walls, one of the broad walls being provided with a longitudinal slot in the middle thereof, and a number of identical equidistant metallic bars disposed outside said wave guide in close, parallel and transverse relationship to said slotted wall, each of said bars being supported in the middle thereof by a metallic support traversing said slot and fixed inside the wave guide to the other broad wall thereof.

16. A delay structure as claimed in claim 15, wherein each bar is integral with its support and forms a T-shaped element.

17. A delay structure as claimed in claim 15, wherein the bars are substantially twice as long as the supports.

18. A delay line structure comprising a rectangular metallic wave guide having two broad and two narrow walls, one of the broad walls being provided with a longitudinal slot in the middle thereof, and a number of identical equidistant metallic bars disposed outside said wave guide in close, parallel and transverse relationship to said slotted wall, each of said bars being supported in the middle thereof by a metallic support traversing said slot and fixed inside the wave guide to the other broad wall thereof, the length of said bars being substantially equal to the width of said broad walls, while the length of said supports is somewhat more than the width of said narrow walls.

19. A delay line structure comprising a metallic wave guide provided with a longitudinal slot, and a number of identical delay members of essentially T-shape including two arm portions and a leg portion, said leg portion extending through said slot and being electrically connected with the inner face of the wave guide opposite said slot while the arm portions of said T-shaped delay members extend along the outside of said wave guide, the outer surface of said wave guide adjacent said arm portions effectively constituting a conductive back plate therefor.

20. A delay circuit for microwaves, comprising at least one series of substantially identical T-shaped conductive delay members each including symmetric arm portions and a leg portion having a length essentially of the order of the length of an arm portion, said members being respectively located in essentially parallel planes and aligned in a direction at an angle to said planes, a conductive back plate extending parallel to the arm portions of said T-shaped members and in proximity thereto on the side of the leg portions of said T-shaped members, said back plate being constituted by a wall of a wave guide provided with at least one slot, said T leg portions passing through said slot, and means for electrically interconnecting the extremities of said leg portions remote from the arm portions by securing said leg portions to the bottom wall of said wave guide opposite said slot.

21. A delay circuit as claimed in claim 20, wherein the wall forming said back plate is provided with ridges which are essentially parallel to said arm portions and engage between successive members thereof.

References Cited in the file of this patent

UNITED STATES PATENTS

| | | |
|---|---|---|
| 2,197,338 | Fritz | Apr. 16, 1940 |
| 2,730,678 | Dohler et al. | Jan. 10, 1956 |
| 2,879,437 | Leblond | Mar. 24, 1959 |
| 2,888,597 | Dohler et al. | May 26, 1959 |

FOREIGN PATENTS

| | | |
|---|---|---|
| 946,688 | France | Dec. 27, 1948 |